United States Patent

Movlazada

(10) Patent No.: US 9,243,681 B2
(45) Date of Patent: Jan. 26, 2016

(54) CENTRIFUGAL PENDULUM DEVICE

(71) Applicant: Schaeffler Technologies AG & Co. KG, Herzogenaurach (DE)

(72) Inventor: Parviz Movlazada, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 51 days.

(21) Appl. No.: 14/037,756

(22) Filed: Sep. 26, 2013

(65) Prior Publication Data

US 2014/0026712 A1 Jan. 30, 2014

Related U.S. Application Data

(63) Continuation of application No. PCT/DE2012/000269, filed on Mar. 16, 2012.

(30) Foreign Application Priority Data

Mar. 31, 2011 (DE) .......................... 10 2011 015 638

(51) Int. Cl.
*F16F 15/14* (2006.01)
*F16H 45/02* (2006.01)

(52) U.S. Cl.
CPC ............... *F16F 15/14* (2013.01); *F16F 15/145* (2013.01); *F16H 2045/0263* (2013.01); *Y10T 74/2128* (2015.01)

(58) Field of Classification Search
USPC ............................................. 74/572.2, 574.2
See application file for complete search history.

(56) References Cited

U.S. PATENT DOCUMENTS

| | | | | |
|---|---|---|---|---|
| 2,548,911 A | * | 4/1951 | Salomon | ...................... 74/574.3 |
| 6,280,330 B1 | | 8/2001 | Eckel et al. | |
| 8,800,731 B2 | * | 8/2014 | Engelmann et al. | .......... 188/290 |
| 2013/0233124 A1 | * | 9/2013 | Wysgol et al. | ............... 74/574.2 |

FOREIGN PATENT DOCUMENTS

| | | |
|---|---|---|
| CN | 1896560 A | 1/2007 |
| CN | 101457803 A | 6/2009 |
| CN | 102792058 A | 11/2012 |
| DE | 102006028556 A1 | 1/2007 |
| DE | 102010054297 A1 | 6/2011 |
| EP | 1744074 A2 * | 1/2007 |
| WO | 2011110150 A | 9/2011 |

OTHER PUBLICATIONS

CN Office Action dated Sep. 1, 2014.

* cited by examiner

*Primary Examiner* — Vicky Johnson
(74) *Attorney, Agent, or Firm* — Simpson & Simpson, PLLC

(57) ABSTRACT

A centrifugal pendulum device having pendulum masses, which are arranged axially on both sides on a pendulum mass carrier which is rotatable about an axis of rotation, the pendulum masses forming a pendulum mass pair, where the pendulum masses are connected to one another, so as to form the pendulum mass pair, by means of at least one fastening element which is movable in a cutout in the pendulum mass carrier, and the pendulum masses are pivotable to a limited extent relative to the pendulum mass carrier along a pendulum raceway, so as to describe an angle of deflection, by means of at least one rolling element which can roll in each case one cutout in the pendulum mass carrier and in the pendulum masses. Here, two circumferentially adjacently arranged pendulum masses are arranged radially one above the other at least in sections.

11 Claims, 2 Drawing Sheets

CENTRIFUGAL PENDULUM DEVICE

CROSS-REFERENCE TO RELATED APPLICATIONS

This application is filed under 35 U.S.C. §120 and §365(c) as a continuation of International Patent Application No. PCT/DE2012/000269 filed Mar. 16, 2012, which application claims priority from German Patent Application No. 10 2011 015 638.0 filed Mar. 31, 2011, which applications are incorporated herein by reference in their entireties.

FIELD OF THE INVENTION

The invention relates to a centrifugal pendulum device.

BACKGROUND OF THE INVENTION

A centrifugal pendulum device for reducing torsional vibrations in a drivetrain of a motor vehicle is known from German Patent Application No. 10 2006 028 556 A1. The torsional vibrations can arise through the operation of a combustion engine and lead to unwanted noises, vibrations, and to failure of components. The centrifugal pendulum device has pendulum masses, which are arranged axially on both sides of a pendulum mass carrier, which is rotatable about an axis of rotation and forms a pendulum mass pair due to the connection by means of a fastening element, which reaches through a cutout in the pendulum mass carrier and is movable.

The pendulum masses are pivotable to a limited extent relative to the pendulum mass carrier along a pendulum raceway by means of at least one rolling element, which is received and can roll in a recess in both the pendulum mass carrier and the pendulum mass while describing a deflection angle. Situated on the pendulum mass carrier is a plurality of pendulum masses circumferentially adjacent to each other, which are able to move relative to each other. The immediately adjacent fastening elements of the respective circumferentially adjacent pendulum masses are also situated circumferentially adjacent to each other, just as the pendulum masses themselves are also situated circumferentially adjacent.

BRIEF SUMMARY OF THE INVENTION

The object of the invention is to improve the extinguishing effect of a centrifugal force oscillating device. It is also an object to reduce the construction space requirement of the centrifugal pendulum device.

Accordingly, a centrifugal pendulum device having pendulum masses, which are arranged axially on both sides of a pendulum mass carrier which is rotatable about an axis of rotation and form a pendulum mass pair is proposed. The pendulum masses are connected to each other to form the pendulum mass pair by means of at least one fastening element which is movable in a cutout in the pendulum mass carrier, and are pivotable to a limited extent relative to the pendulum mass carrier along a pendulum raceway, while describing an angle of deflection, by means of at least one rolling element which is received and can roll in a recess in both the pendulum mass carrier and the pendulum masses. At least two pendulum masses are situated circumferentially adjacent to each other. At the same time, two pendulum masses situated circumferentially adjacent are situated at least partially radially above each other, which can enable improved construction space utilization and can allow greater extinguishing performance of the centrifugal pendulum device.

In an embodiment of the invention, two pendulum masses, which are situated circumferentially adjacent, are situated at least partially radially above each other at every angle of deflection.

In another embodiment of the invention, a pendulum mass pair has two fastening elements, the two fastening elements being situated at different radii in reference to the pendulum mass.

Preferably, a first cutout in the pendulum mass carrier for receiving a first fastening element of a first pendulum mass and a second cutout in the pendulum mass carrier for receiving a second fastening element of a second pendulum mass situated circumferentially adjacent are situated partially radially above each other. Preferably, the circumferential extension of the first and second cutouts is the same in at least one circumferential direction.

Accordingly, a centrifugal pendulum device having pendulum masses, which are arranged axially on both sides of a pendulum mass carrier which is rotatable about an axis of rotation and form a pendulum mass pair is proposed. The pendulum masses are connected to each other to form the pendulum mass pair by means of at least one fastening element which is movable in a cutout in the pendulum mass carrier, and are pivotable to a limited extent relative to the pendulum mass carrier along a pendulum raceway, while describing an angle of deflection, by means of at least one rolling element which is received and can roll in a recess in both the pendulum mass carrier and the pendulum masses. At least two pendulum masses are situated circumferentially adjacent to each other. At the same time, a first cutout in the pendulum mass carrier for receiving a first fastening element of a first pendulum mass and a second cutout in the pendulum mass carrier for receiving a second fastening element of a second pendulum mass situated circumferentially adjacent are situated at least partially radially above each other. As a result, the existing construction space can be better utilized and a greater extinguishing performance of the centrifugal pendulum device can be achieved.

In an embodiment of the invention, a pendulum mass pair has two fastening elements, the two fastening elements being situated at different radii in reference to the pendulum mass.

In another embodiment of the invention, two pendulum masses which are situated circumferentially adjacent, are situated at least partially radially above each other. Preferably, two pendulum masses, which are situated circumferentially adjacent, are situated at least partially radially above each other at every angle of deflection.

In yet another embodiment of the invention, the circumferential extension of the first and second cutouts is the same in at least one circumferential direction.

The centrifugal pendulum device can be situated on and/or in a hydrodynamic torque converter, on and/or in a clutch device, for example, a wet-running clutch, on and/or in a dual clutch device, on a dual-mass flywheel or a torsional vibration damper.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
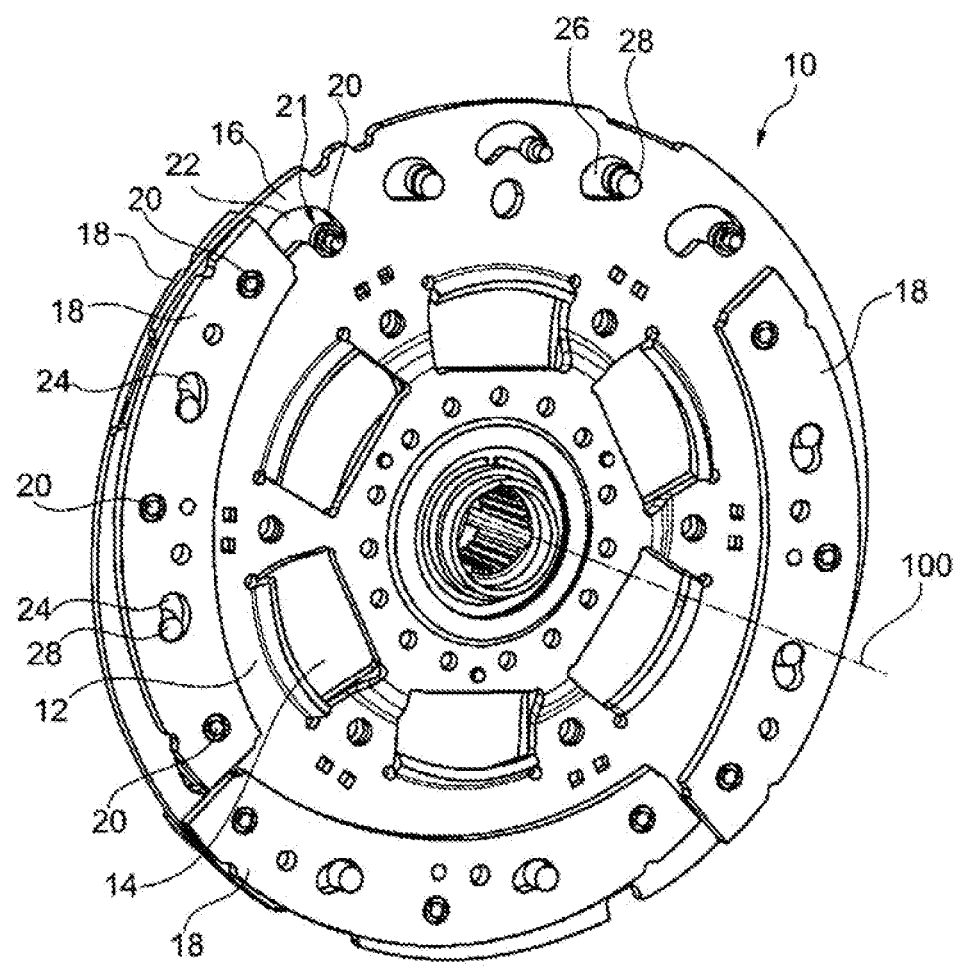
FIG. 1 is a three-dimensional side view of a centrifugal pendulum device according to the existing art.

FIG. 1 depicts a three-dimensional side view of centrifugal pendulum device 10 according to the existing art, where an upper pendulum mass pair has been faded out in this drawing depiction to clarify the area lying axially beneath. Centrifugal pendulum device 10 is situated on damper component 12 of a torsional vibration damper, which damper component is rotatable about axis of rotation 100. Damper component 12 has, in a radially inner circumferential region, cutouts 14 to receive energy storage elements (not shown here), for example coil springs, damper component 12 being rotatable to a limited extent relative to another damper component (not shown here) through the effect of these energy storage elements.

For example, the torsional vibration damper brings about a damping of torsional vibrations, which are caused by a combustion engine. The torsional vibration damper can be situated operationally in a drivetrain of a motor vehicle, between the combustion engine and a gear unit.

The radial elongation of damper component 12 forms pendulum mass carrier 16 to receive pendulum masses 18 situated on both sides of pendulum mass carrier 16. Two pendulum masses 18 in each case are situated axially on both sides of pendulum mass carrier 16 and are joined together by means of a total of three fastening elements 20, for example, spacers, spacing bolts, rivets, clinch bolts, to form a pendulum mass pair. Fastening elements 20 are firmly connected to pendulum masses 18, for example, by riveting, and form in a region axially between pendulum masses 18 cylindrical section 21, which reaches through cutouts 22 in pendulum mass carrier 16, cutouts 22 being kidney-shaped and formed in such a way that they enable a motion of pendulum masses 18 relative to pendulum mass carrier 16 along a defined pendulum raceway. The motion of pendulum masses 18 relative to pendulum mass carrier 16 can be either linear or also linear in combination with a twisting of the pendulum mass pair around its pendulum mass center of gravity.

The pendulum raceway itself is defined by contour of recesses 24 in pendulum masses 18 and complementary recesses 26 in pendulum mass carrier 16, where in here specifically kidney-shaped recesses 24, 26 rolling elements 28, for example, rollers, are received, which can roll on recesses 24, 26 to enable the pendulum mass pair to move along the pendulum raceway.

Figure 2A:
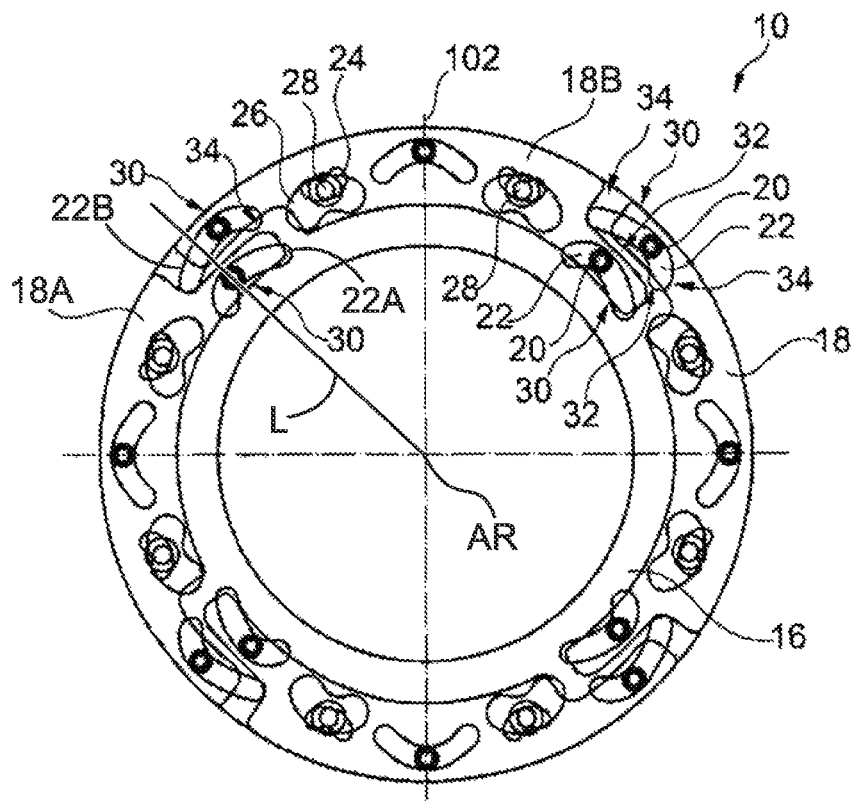
FIG. 2a is a side view and partial transparent view of a centrifugal pendulum device in an embodiment of the invention with the pendulum masses in a first state of deflection; and, FIG. 2b is a side view and partial transparent view of the centrifugal pendulum device from FIG. 2a with the pendulum masses in a second state of deflection.
Figure 2B:
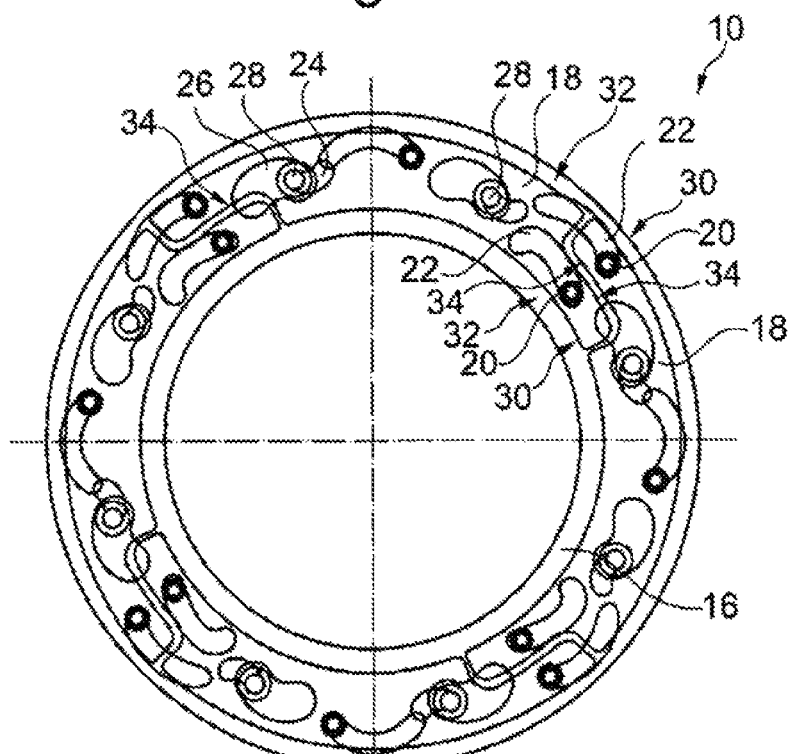

FIG. 2a shows a side view and partial transparent view of centrifugal pendulum device 10 in an embodiment of the invention with pendulum masses 18 in a first state of deflection. FIG. 2b shows a side view and partial transparent view of centrifugal pendulum device 10 from FIG. 2a with pendulum masses 18 in a second state of deflection. In the first state of deflection, pendulum masses 18 of centrifugal pendulum device 10 are located opposite pendulum mass carrier 16 in a neutral position, while pendulum masses 18 are deflected maximally in the second deflection state in reference to the pendulum raceway describable by an angle of deflection. The following description refers to FIG. 2a and FIG. 2b.

Centrifugal pendulum device 10 has a total of four pendulum mass pairs situated circumferentially adjacent on pendulum mass carrier 16, where a pendulum mass pair includes two pendulum masses 18 fastened together by means of three fastening elements 20, for example, spacing bolts, clinch bolts, rivets, bolts, screws, and the like. Two pendulum masses 18 of a pendulum mass pair are located axially opposite each other, each on one side of pendulum mass earner 16. Fastening elements 20 reach, in each case, through cutouts 22 in pendulum mass carrier 16 and are movable, so that a movement of pendulum mass 18 along a pendulum raceway while describing an angle of deflection can be made possible.

The pendulum raceway is made possible by two rolling elements 28 in each case per pendulum mass pair, which can roll in corresponding complementary cutouts 24, 26 in pendulum masses 18 and in pendulum mass carrier 16, and thus, largely define the pendulum raceway. At the same time, two circumferentially adjacent pendulum masses 18 are situated in such a way that pendulum masses 18 are located partially radially above each other in both the first deflection state and the second deflection state. In this case, region 30 of pendulum masses 18 located radially above is smaller in the first deflection state than in the second deflection state. For example, pendulum masses 18 are located at least partially radially above each other in every deflection state, meaning at every deflection angle.

In order to enable the radial overlay, pendulum masses 18 are each partially interrupted in their circumferential end zone 32, it being possible to fit into interrupted section 34 the respective circumferentially adjacent pendulum mass 18, which has a complementarily formed interrupted section 34. In this case, pendulum mass 18 is designed so that interrupted section 34 is spaced at one circumferential end of pendulum mass 18 radially at a distance from interrupted section 34 of the respective other circumferential end of this pendulum mass 18. This can result in pendulum mass 18 being non-mirror-symmetrical in reference to radially running center line 102 defined by the two circumferential ends.

In the area of pendulum masses 18 lying radially above or below interrupted section 34, fastening element 20 is installed on each pendulum mass 18, just as fastening element 20 is situated on respective circumferentially adjacent pendulum mass 18 in an area of that pendulum mass 18 which fits into interrupted section 34. Two fastening elements 20, which belong to different pendulum masses 18, are each inserted into and movable in separate cutouts 22. Cutouts 22, whose circumferential extension is the same in at least one circumferential direction, are situated partially radially above each other. Fastening elements 20 can overlap radially in their circumferential movement during the deflection of pendulum masses 18 along the pendulum raceway. For example, two fastening elements 20, which are situated respectively at the circumferential ends of pendulum mass 18, are spaced radially at a distance from each other in reference to pendulum mass 18, meaning that they are situated at different radii. Line L, orthogonal to axis of rotation AR, passes through cutout 22A for mass 18A and through cutout 22B for mass 18B.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 10 centrifugal pendulum device
12 damper component
14 cutout
16 pendulum mass carrier
18 pendulum mass
20 fastening element
21 section
22 cutout
24 recess
26 recess
28 rolling element
30 region
32 end region
34 section
102 center line

What is claimed is:

1. A centrifugal pendulum device, comprising:
a pendulum mass carrier rotatable about an axis of rotation; and,
a plurality of pendulum masses:
including a first pendulum mass and a second pendulum mass;
which are arranged axially on both sides of the pendulum mass carrier; and
forming a plurality of pendulum mass pairs, where respective pendulum masses in each pair of pendulum masses:
are connected to each other to form said each pendulum mass pair by means of at least one respective fastening element, which is movable in at least one respective cutout in the pendulum mass carrier; and
are pivotable to a limited extent relative to the pendulum mass carrier along at least one respective pendulum raceway in the pendulum mass carrier, while describing an angle of deflection, by means of at least one respective rolling element which can roll in respective recesses in both the pendulum mass carrier and the pendulum masses, wherein:
the first pendulum mass and the second pendulum mass are on a same side of the pendulum mass carrier and are situated circumferentially adjacent to each other;
respective portions of the first and second circumferentially adjacent pendulum masses are situated at least partially radially above each other; and,
the respective portions of the first and second circumferentially adjacent pendulum masses overlap each other in a direction orthogonal to the axis of rotation.

2. The centrifugal pendulum device as recited in claim 1, wherein the respective portions of the first and second circumferentially adjacent pendulum masses overlap each other in the direction orthogonal to the axis of rotation at every angle of deflection.

3. The centrifugal pendulum device as recited in claim 1, wherein a first pendulum mass pair included in the plurality of pendulum mass pairs, has two fastening elements, the two fastening elements being situated at different radii in reference to the first pendulum mass pair.

4. The centrifugal pendulum device as recited in claim 1, wherein:
the pendulum mass carrier includes:
a first cutout for receiving a first fastening element of the first pendulum mass; and
a second cutout for receiving a second fastening element of the second pendulum mass;
the first and second cutouts overlap each other in the direction orthogonal to the axis of rotation.

5. The centrifugal pendulum device as recited in claim 4, wherein respective circumferential extensions of the first and second cutouts are the same in at least one circumferential direction.

6. A centrifugal pendulum device, comprising:
a pendulum mass carrier rotatable around an axis of rotation; and,
a plurality of pendulum masses:
including a first pendulum mass and a second pendulum mass;
situated axially on the pendulum mass carrier; and
forming a plurality of pendulum mass pairs, where respective pendulum masses in each pair of pendulum masses:
are connected to each other, by means of at least one respective fastening element that is movable in at least one respective cutout in the pendulum mass carrier, to form said each pair of pendulum masses; and
are pivotable to a limited extent relative to the pendulum mass carrier by means of at least one respective rolling element which can roll in respective recesses in both the pendulum mass carrier and the pendulum masses along a pendulum raceway while describing an angle of deflection, wherein:
the first pendulum mass and the second pendulum mass are situated circumferentially adjacent to each other;
a first cutout in the pendulum mass carrier receives a first fastening element connected to the first pendulum mass;
a second cutout in the pendulum mass carrier receives a second fastening element connected to the second pendulum mass;
the first and second cutouts are situated at least partially radially above each other; and,
the first cutout overlaps the second cutout in a direction orthogonal to the axis of rotation.

7. The centrifugal pendulum device as recited in claim 6, wherein a first pendulum mass pair, included in the plurality of pendulum mass pairs, has two fastening elements, the two fastening elements being situated at different radii in reference to the pendulum mass.

8. The centrifugal pendulum device as recited in claim 6, wherein the first and second circumferentially adjacent pendulum masses overlap each other in the direction orthogonal to the axis of rotation.

9. The centrifugal pendulum device as recited in claim 8, wherein the first and second circumferentially adjacent pendulum masses overlap each other in the direction orthogonal to the axis of rotation at every deflection angle.

10. The centrifugal pendulum device as recited in claim 6, wherein respective circumferential extensions of the first and second cutouts are the same in at least one circumferential direction.

11. A centrifugal pendulum device, comprising:
an axis of rotation;
a pendulum carrier including:
 a first cutout and a second cutout; and,
 a first recess and a second recess
a first pendulum mass including a third recess;
a second pendulum mass:
 circumferentially adjacent to the first pendulum mass; and,
 including a fourth recess;
a first fastening element passing through the first cutout and connected to the first pendulum mass;
a second fastening element passing through the second cutout and connected to the second pendulum mass;
a first rolling element disposed in the first and third recesses; and,
a second rolling element disposed in the second and fourth recesses, wherein a line orthogonal to the axis of rotation passes through first and second cutouts.

* * * * *